United States Patent [19]

Fukahori et al.

[11] Patent Number: 5,091,742
[45] Date of Patent: Feb. 25, 1992

[54] CAMERA HAVING AN AUTO FOCUSING DEVICE

[75] Inventors: Hidehiko Fukahori; Yasuo Suda; Kenji Itoh; Masaki Higashihara; Keisuke Aoyama, all of Yokohama, Japan

[73] Assignee: Canon Kabushiki Kaisha, Tokyo, Japan

[21] Appl. No.: 499,634

[22] Filed: Mar. 27, 1990

[30] Foreign Application Priority Data

Mar. 29, 1989 [JP] Japan .................. 1-076964

[51] Int. Cl.⁵ .................. G03B 7/00; G03B 13/36
[52] U.S. Cl. .................. 354/402; 354/441; 354/446
[58] Field of Search .................. 354/400–409, 354/446, 441

[56] References Cited

U.S. PATENT DOCUMENTS

| | | | |
|---|---|---|---|
| 4,575,211 | 3/1986 | Matsumara et al. | 354/403 |
| 4,614,418 | 9/1986 | Ishizaki et al. | 354/407 |
| 4,639,110 | 1/1987 | Rinn et al. | 354/403 |
| 4,764,786 | 8/1988 | Tamura et al. | 354/403 |
| 4,800,410 | 1/1989 | Akashi et al. | 354/408 |
| 4,827,303 | 5/1989 | Tsuboi | 354/403 |
| 4,829,331 | 5/1989 | Aihara | 354/400 |
| 4,859,842 | 8/1989 | Suda et al. | 354/408 X |
| 4,905,032 | 2/1990 | Ishida et al. | 354/402 |
| 4,908,646 | 3/1990 | Sato et al. | 354/402 |
| 4,933,700 | 6/1990 | Ikeda et al. | 354/400 |
| 4,943,824 | 7/1990 | Nabeshima et al. | 354/400 |
| 4,977,311 | 12/1990 | Kusaka et al. | 354/402 X |

FOREIGN PATENT DOCUMENTS

61-236841 10/1986 Japan .

*Primary Examiner*—W. B. Perkey
*Attorney, Agent, or Firm*—Fitzpatrick, Cella, Harper & Scinto

[57] ABSTRACT

An auto focusing device or a camera including such a device has a focus detecting circuit for detecting the defocus states of a plurality of objects. A calculation circuit calculates a lens position and an aperture value which are capable of placing at least two of the plurality of objects in focus on the basis of the detected defocus states. When a defocus amount difference between the two objects is outside of a predetermined range, the calculation circuit calculates a lens position capable of placing two other objects, the defocused amount difference between which is within the predetermined range, in focus.

26 Claims, 7 Drawing Sheets

SELECT DEFOCUS AMOUNTS A, B TO THE FARTHEST AND NEAREST POINTS AMONG THE DEFOCUS AMOUNTS OF EACH AREA BASED ON IMAGE SIGNAL FROM EACH PAIR OF SENSORS, AND DETERMINE
$X = \frac{A+B}{2}$, $\alpha = A-X$ OR $B-X$,
$Av = \frac{\alpha}{35 \mu m}$

FIG. 10

DETERMINE $X = \frac{A+C}{2}$, $\alpha = C-X$,
$Av' = \frac{\alpha}{35 \mu m}$
BASED ON DEFOCUS AMOUNT A TO THE NEAREST POINT AND DEFOCUS AMOUNT C TO CENTER DISTANCE MEASURING POINT

FIG. 11

DETERMINE $X = \frac{B+C}{2}$, $\alpha = C-X$,
$Av' = \frac{\alpha}{35 \mu m}$
BASED ON DEFOCUS AMOUNT C TO THE CENTRAL POINT AND DEFOCUS AMOUNT B TO THE FAREST POINT

CAMERA HAVING AN AUTO FOCUSING DEVICE

BACKGROUND OF THE INVENTION

1. Field of the Invention

This invention relates to an auto focus camera adapted to be focused on a plurality of different objects with the depth of field added thereto.

2. Related Background Art

As a camera of this type, there has heretofore been proposed a camera which, as described in Japanese Patent Application No. 61-236841, has a distance measuring position in the central portion of the picture plane and is shaken relative to different objects to thereby effect distance measurement and determine the defocus amounts of the respective objects, and then is operated at an aperture value for bringing about a state wherein each object is in focus.

In the above-described example of the prior art, however, focusing is effected by the utilization of the depth of field and thus, the greater is the distance between the objects, the more stopped down is the aperture. Thereupon, as a matter of course, the shutter speed takes a long shutter time and in the case of manual photographing, camera shake will more readily degrade the picture.

Accordingly, it has often been the case that although the camera is in focus, a blurred photograph results from the camera shake.

Also, recently, there has been proposed an auto focus camera which is capable of distance measurement not only at the center of the picture plane, but also at a plurality of positions, and the camera of this type need not be shaken each time, but if an object lies at each distance measuring position, the camera can be focused at that position.

SUMMARY OF THE INVENTION

One aspect of the present invention is to provide a camera in which, when determining defocus amounts to a plurality of objects and calculating the mean defocus amount of said defocus amounts and an aperture value for bringing about a state wherein to said plurality of objects are in focus at a the same time, if the difference between the defocus amounts of the objects becomes greater than a predetermined value or said aperture value becomes a value more toward the stop-down side than a predetermined value and the shutter time for obtaining proper exposure becomes long, lens control and aperture control based on said calculated mean defocus amount and said calculated aperture value are inhibited.

Another aspect of the present invention is to provide, under the above object, a camera in which, if the difference between said defocus amounts becomes greater than a predetermined value or said aperture value becomes a value more toward the stop-down side than a predetermined value, lens driving is controlled on the basis of the defocus amount to a predetermined one of said plurality of objects.

A further aspect of the present invention is to provide an auto focusing device or a camera which is provided with a focus detecting circuit for independently detecting focus states (defocus) in a plurality of different areas and in which a lens position and an aperture value for bringing in focus each of the objects in a plurality of areas are automatically determined on the basis of the defocus amounts of the objects in the respective areas detected by said circuit.

Yet another aspect of the present invention is to provide, under the above object, an auto focusing device or a camera which, when the defocus amount between objects at the farthest point and the nearest point is greater than a predetermined value, selects a plurality of objects indicating a difference in defocus amount within a predetermined value and is focused on said plurality of selected objects.

Other objects of the present invention will become apparent from the following detailed description of some embodiments of the invention taken in conjunction with the accompanying drawings.

BRIEF DESCRIPTION OF THE DRAWINGS

FIG. 8 comprising FIGS. 8A, 8B, and 8C show a program flow for illustrating the operation of another embodiment of the present invention.

DESCRIPTION OF THE PREFERRED EMBODIMENTS

Figure 1:
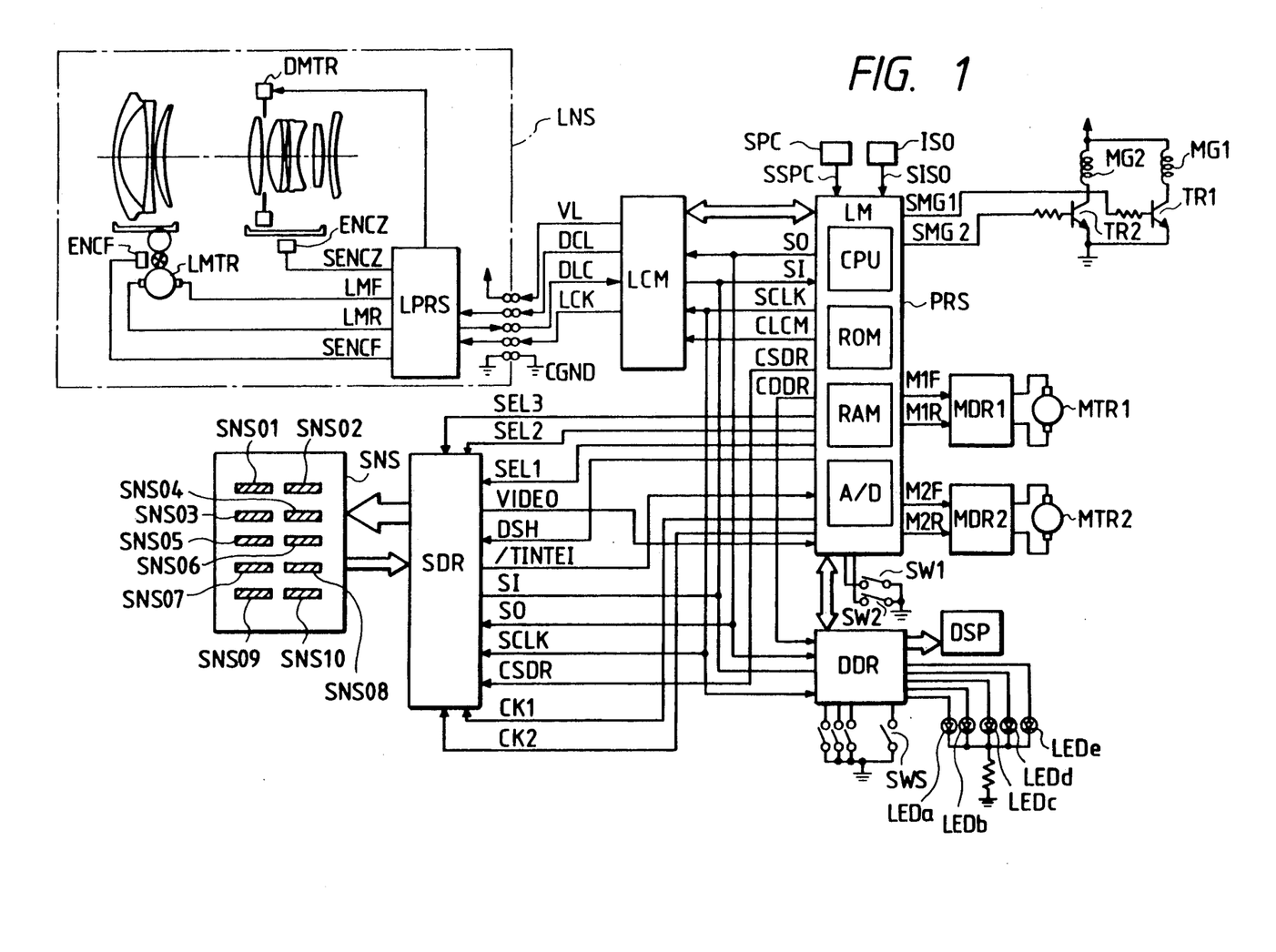
FIG. 1 is a circuit diagram showing an embodiment of an auto focus camera according to the present invention.

FIG. 1 is a circuit diagram showing an embodiment of a camera provided with the auto focusing device of the present invention, and the constructions of various portions thereof will first be described.

In the figure, PRS designates a control device for the camera which is, for example, a 1-chip microcomputer having therein a CPU (central processing unit), a ROM, a RAM, and an A/D converting function. The microcomputer PRS performs a series of operations of the camera such as an automatic exposure controlling function, an automatic focus adjusting function, a display function, a winding up and rewinding of the film in accordance with the sequence program of the camera stored in the ROM. For that purpose, the microcomputer PRS uses communication signals SO, SI, SCLK and communication selection signals CLCM, CSDR, CDDR to communicate with the surrounding circuits of the camera body and a control device in a lens, and to control the operations of the respective circuits and the lens.

SO is a data signal output from the microcomputer PRS, SI is a data signal input to the microcomputer PRS, and SCLK is a synchronizing clock for the signals SO and SI.

LCM denotes a lens communication buffer circuit which supplies electric power to a power source terminal VL for the lens when the camera is in operation, and provides a communication buffer between the camera and the lens when the selection signal CLCM from the microcomputer PRS is at a high potential level (hereinafter referred to as 'H', and a low potential level will hereinafter be referred to as 'L').

When the microcomputer PRS sets CLCM to 'H' and delivers predetermined data from SO in synchronism with SCLK, the lens communication buffer circuit LCM outputs buffer signals LCK and DCL for SCLK and SO, respectively, to the lens through the communication contact between the camera and the lens. Simultaneously therewith, it outputs a buffer signal for a signal DLC from the lens to SI, and the microcomputer PRS receives as an input the data of the lens from SI in synchronism with SCLK.

DDR designates a switch detection and display circuit which is selected when the signal CDDR is at 'H', and is controlled from the microcomputer PRS by the use of SO, SI and SCLK. That is, it changes over the display on the display member DSP of the camera on the basis of data sent from the microcomputer PRS, and selectively operates LEDa-LEDe for superimposed display, and further informs the microcomputer PRS of the ON and OFF states of the various operating members of the camera by communications.

SW1 and SW2 denote switches operatively associated with a release button, not shown. The switch SW1 is closed by the first-stage depression of the release button, and subsequently the switch SW2 is closed by the second-stage depression of the release button. The microcomputer PRS effects photometry and automatic focus adjustment upon closing of the switch SW1, and effects exposure control and then winding up of the film with the closing of the switch SW2 as a trigger.

The switch SW2 is connected to the "interrupt input terminal" of the microcomputer PRS, and even when the program is being executed during the closing of the switch SW1, interruption is applied by the closing of the switch SW2 and control can be immediately shifted to a predetermined interrupt program.

MTR1 designates a film feeding motor, and MTR2 denotes a mirror up-down and shutter spring charging motor. The control of the forward and reverse revolutions of these motors MTR1 and MTR2 is effected by their respective driving circuits MDR1 and MDR2. Signals M1F, M1R, M2F and M2R input from PRS to MDR1 and MDR2 are motor controlling signals.

MG1 and MG2 designate magnets for starting the movements of forward and rearward shutter curtains. These magnets are electrically energized by signals SMG1, SMG2 and amplifying transistors TR1, TR2, and shutter control is effected by the microcomputer PRS.

A signal DCL input in synchronism with LCK of the control circuit LPRS in the lens is command data from the camera to the photo-taking lens LNS, and the operation of the lens in response to the command is predetermined. LPRS analyzes that command in accordance with a predetermined procedure, and effects the outputting of the focus adjusting and aperture controlling operations, the operations of the various portions of the lens from an output DLC (such as the driving situation of a focus adjusting optical system and the driving state of the aperture), and various parameters (such as fully open F-number, focal length, and the coefficient of defocus amount vs. the amount of movement of the focus adjusting optical system).

An example of a zoom lens is shown in the present embodiment, and when a command for focus adjustment is sent from the camera, a focus adjusting motor LTMR is driven by signals LMF and LMR in accordance with the amount and direction of driving sent at the same time, and the focus adjusting optical system is moved in the direction of the optic axis to thereby effect focus adjustment. The amount of movement of the optical system is monitored by the pulse signal SENCF of an encoder circuit ENCF and is counted by a counter in LPRS, and at a point of time whereat a predetermined movement is completed, LPRS itself sets the signals LMF and LMR to 'L' and controls the motor LMTR.

Therefore, once the command for focus adjustment has been sent from the camera, the control device PRS for the camera need not at all be concerned in lens driving until the driving of the lens is terminated. The design is such that when there is a demand from the camera, the content of said counter can be delivered to the camera.

When a command for aperture control is sent from the camera, a stepping motor DMTR (conventional as an aperture driving motor) is driven in accordance with the number of aperture steps sent at the same time.

ENCZ designates an encoder circuit annexed to a zoom optical system, and LPRS receives as an input a signal SENCZ from the encoder circuit ENCZ and detects the zoom positions. Lens parameters in the respective zoom positions are stored in LPRS, and when there is a demand from the microcomputer PRS of the camera, a parameter corresponding to the current zoom position is delivered to the camera.

SPC denotes a photometering sensor for exposure control which receives light from an object passed through the photo-taking lens, and the output SSPC thereof is input to the analog input terminal of the microcomputer PRS and is A/D-converted, whereafter it is used for automatic exposure control in accordance with a predetermined program.

ISO designates means for reading the sensitivity of the film. The reading means ISO electrically reads the Dx code of the film, and inputs the read film sensitivity signal SISO to the microcomputer PRS.

SDR designates a driving circuit for a line sensor device SNS for focus detection. The driving circuit SDR is selected when signal CSDR is at 'H', and is controlled from the microcomputer PRS by the use of SO, SI and SCLK.

Signals SEL1, SEL2 and SEL3 imparted from the microcomputer PRS to the driving circuit SDR are signals for selecting one of the image signal outputs of a pair of sensor arrays SNSO1, SNSO2 and a pair of sensor arrays SNSO9, SNSO10, and after the termination of accumulation, the image signals of the selected pair of sensor arrays are output.

Each pair of sensor arrays are sensors for independently detecting the focus states of different picture plane areas.

The output VIDEO of the driving circuit SDR is an image signal amplified by a gain determined by the luminance of the object after the differential between the image signal from the sensor device SNS and a dark current output has been taken.

The dark current output is the output value of a picture element in the sensor arrays which is shielded from light, and the driving circuit SDR holds the dark current output value in a capacitor by a signal DSH from the microcomputer PRS and effects differential amplification with respect to an image signal from another picture element in the sensor arrays.

VIDEO is connected to the analog input terminal of the microcomputer PRS, and the microcomputer PRS A/D-converts the same signal and thereafter, stores the digital values thereof successively into a predetermined address of the RAM.

/TINTEO is a signal representing that charges accumulated in the sensor arrays have become proper, and in response thereto, the microcomputer PRS executes the reading-out of the image signal.

CK1 and CK2 are clocks for producing the driving clock of the sensor device SNS.

By the microcomputer PRS setting signal CSDR to 'H' and delivering a predetermined "accumulation starting command" to the driving circuit SDR, the accumulating operation of the sensor device SNS is started.

Thereby, the photoelectric conversion of the object image is effected in the sensor, and charges are accumulated in the photoelectric conversion element of the sensor. When this potential reaches a predetermined level, the driving circuit SDR sets the signal /TINTEO to 'L'.

In response to this, the microcomputer PRS outputs a predetermined waveform to the clock CK2.

The driving circuit SDR produces a clock on the basis of the clock CK2 and imparts it to the sensor device SNS, which in turn outputs an image signal according to said clock, signal and the microcomputer PRS A/D-converts VIDEO input to the analog input terminal thereof by the A/D converting function therein in synchronism with the clock CK2 being output by the microcomputer itself, whereafter it stores the digital signals successively at a predetermined address in the RAM.

Figure 2:
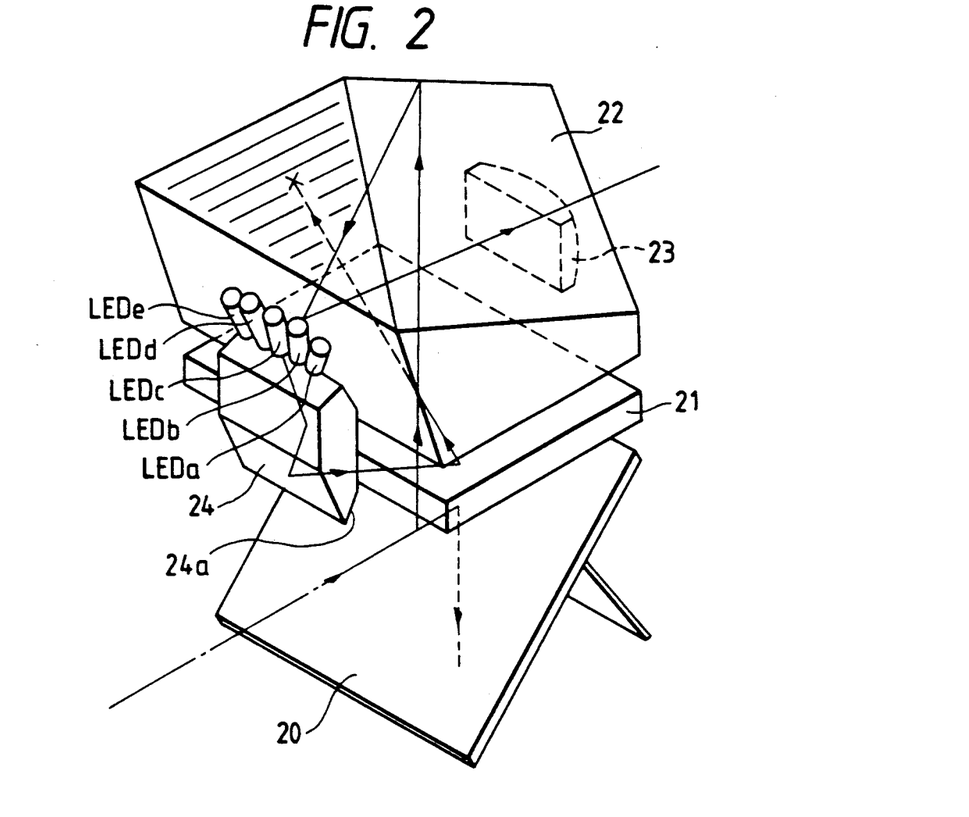
FIG. 2 shows the construction of a viewfinder optical system used in the camera of the present invention.
Figure 3:
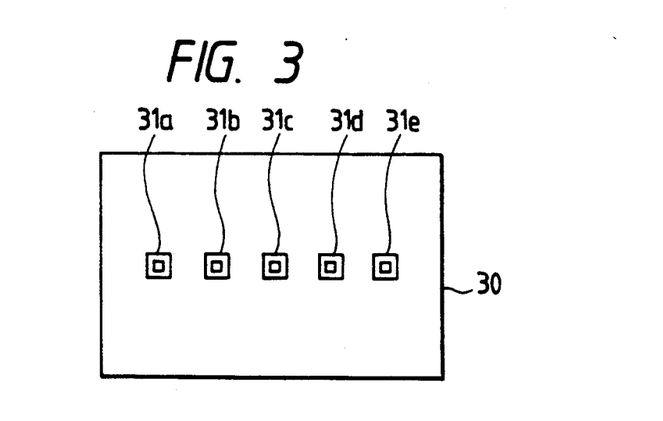
FIG. 3 illustrates the state of the picture plane in the viewfinder optical system shown in FIG. 2.

FIGS. 2 and 3 illustrate the superimposed distance measuring field display, and FIG. 2 is a perspective view of the essential portions thereof. In FIG. 2, LEDa-LEDe designate LED's for display, and correspond to display patterns 31a-31e, respectively, on the focusing screen of FIG. 3. The reference numeral 30 denotes a viewfinder field frame. When an LED for display is caused to emit a light, the light beam thereof is directed to a display pattern portion on the focusing screen by a projection lens 24 and a movable half-mirror 20 as shown in FIG. 2.

A Fresnel lens is provided on the exit surface 24a of the projection lens 24 so that a display may be made by the light emission of an LED with the aid of the action of this Fresnel lens.

The locations of the display patterns 31a-31e are in a positional relation corresponding to the pairs of sensor arrays of the sensor device SNS of FIG. 1, and by LEDa-LEDe being selectively caused to emit a light, it is possible to effect the display of in-focus state.

Figure 4:
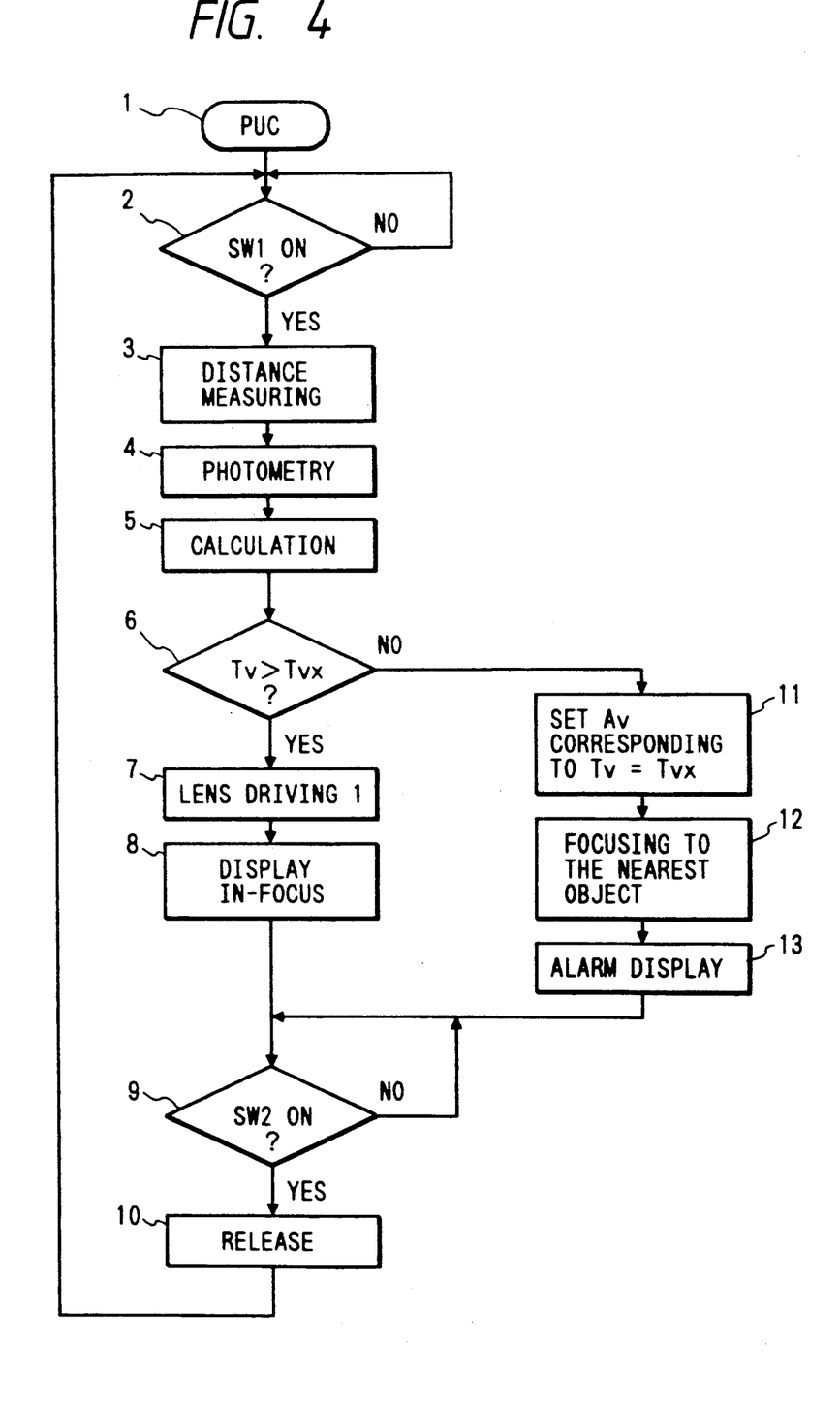
FIG. 4 shows a program flow for illustrating the operation of the present invention.

The operation of the above-described embodiment will now be described with reference to FIG. 4. The program shown in FIG. 4 is written in the ROM contained in the microcomputer PRS, and numbers indicate program steps.

Step 1: A power source switch, not shown, is closed, whereupon power is supplied to the computer PRS and a power-up clear is effected, whereafter the operation takes place in the order of the following steps.

Step 2: Whether the switch SW1 has been closed by the half-depression of the release button, not shown, is judged, and when the closing of the switch SW1 is detected, an advance is made to a step 3.

Step 3: The image signal in each area from each sensor array is input to the microcomputer PRS through the VIDEO terminal on the basis of an image entering the sensor device SNS through the lens LNS, and the defocus amount in each area is calculated in the microcomputer PRS.

Figure 5:
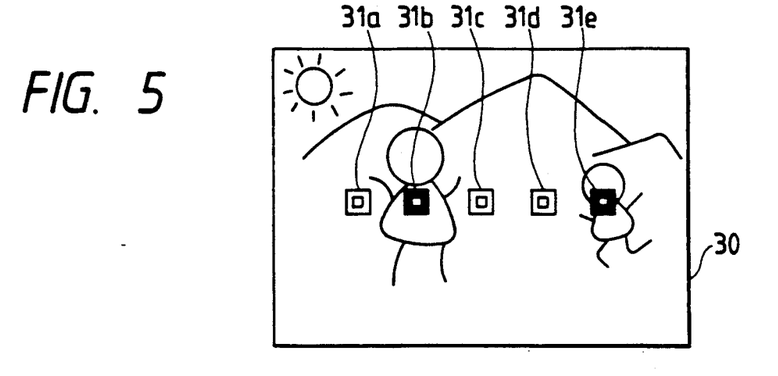
FIGS. 5, 6 and 7 illustrate the states of an object in the viewfinder picture plane.

For example, in the case of objects shown in FIG. 5, the objects lie at distance measuring positions 31b and 31e. Consequently, in this case, a selecting member, not shown, is operated to select pairs of sensor arrays SNSO3, SNSO4 and SNSO9, SNSO10 for the distance measuring positions 31b and 31e, and image signals from these pairs of sensor arrays are input to the microcomputer PRS through the VIDEO terminal, and the defocus amount is calculated on the basis of the image signals from these pairs of sensor arrays.

Each pair of sensor arrays perform the accumulating operation, and when they terminate their accumulating operation, ITINTEI is rendered into L, and the image signals of said selected pairs of sensor arrays are read out.

Step 4: The brightness of the object is photometered by the photometering sensor SPC and is input to the microcomputer PRS through SSPC, and is A/D-converted and Bv is memorized as an apex value. Also, by reading the Dx code attached to the film container, Sv is input as the apex value of ISO sensitivity to the microcomputer PRS through SISO and a calculation of $Ev = Bv + Sv$ is effected in the CPU.

Step 5: A defocus amount for which the defocus amounts to the respective objects coincide with each other is determined from the defocus amounts of the respective objects obtained at the step 3 and is defined as X.

That is, when the defocus amount of the distance measuring position 31b is $A_1$ and the defocus amount of the distance measuring position 31e is $B_1$, there is obtained the defocus amount $$X = \frac{B_1 + A_1}{2}$$

representative of the intermediate point therebetween. Also, $\alpha = B_1 - X$ is found, and the value obtained by dividing $\alpha$ by the circle of least confusion $= 35 \mu m$ is the aperture value, and Av is found as the apex value thereof.

Subsequently, from Ev obtained at the step 4, the apex value Tv of the shutter speed is calculated by $Tv = Ev - Av$.

Also, the zoom position of the currently mounted lens is detected from the zoom encoder circuit ENCZ of the lens and the focal length information of the lens is input to the microcomputer through the control circuit LPRS in the lens and the lens communication buffer circuit LCM. This focal length information is defined as f. For example, in the case of a lens having a focal length of 125 mm, f=125.

Generally, the limit shutter speed for camera shake is said to be 1/focal length.

That is, in the case of a lens having a focal length of 125 mm, camera shake will become a problem if the shutter time is longer than $1/f = 1/125$ sec.

In this manner, the camera shake limit shutter speed of the currently mounted lens is calculated on the basis of the focal length of the lens, and an apex value Tvx corresponding thereto is calculated.

Step 6: The Tv value and Tvx value calculated at the step 5 are compared with each other. That is, whether the shutter speed for obtaining proper exposure is higher than the camera shake limit shutter speed is judged.

If the Tv value is Tv=1/250, the camera shake limit value is Tvx=1/125 sec. because the currently mounted lens is a lens having a focal length of 125 mm, and thus Tv>Tvx and it is judged that camera shake will not be caused, and an advance is made to a step 7.

Step 7: From the defocus amount of each object found at the step 3, the motor LMTR for focus adjustment is driven so that the lens is focused to the intermediate position between the objects. That is, the defocus X found at the step 5 is transmitted to the lens device LNS and the lens is driven by an amount corresponding to X.

Also, the aperture value Av found at the step 5 is an aperture value at which each object is within the depth of field and therefore, the respective distance-measured objects are all photographed in focus.

Step 8: The distance measurement display patterns 31b and 31e of FIG. 5 are superimpose-displayed. That is, when LEDb and LEDe are turned on, the display patterns 31b and 31e are illuminated and are in-focus-displayed as superimposed within the viewfinder to thereby inform the photographer of an object to which the lens will be in focus.

Step 9: The release button is further depressed and whether the switch SW2 has been closed is judged, and if it is judged that the switch SW2 has been closed, an advance is made to a step 10, where the camera is released. That is, at the step 10, the stepping motor DMTR for aperture driving shown in FIG. 1 is driven and the lens is set to an aperture corresponding to the Av value found at the step 5. The motor MTR2 is then electrically energized to effect mirror up, whereafter the magnet MG1 for starting the movement of the forward shutter curtain is electrically energized to move the forward shutter curtain. When a time corresponding to the shutter time Tv elapses, the magnet MG2 for starting the movement of the rearward shutter curtain is electrically energized to move the rearward shutter curtain, thereby terminating exposure. When exposure is terminated, the stepping motor DMTR for aperture driving is immediately driven to make the aperture open and at the same time, the motor MTR2 is electrically energized to drive down the mirror and charge the shutter spring. Further, the film feeding motor MTR1 is electrically energized to wind up the film by one frame. Thus, the preparation for the next photographing operation is completed and a return is made to the step 2.

Figure 6:
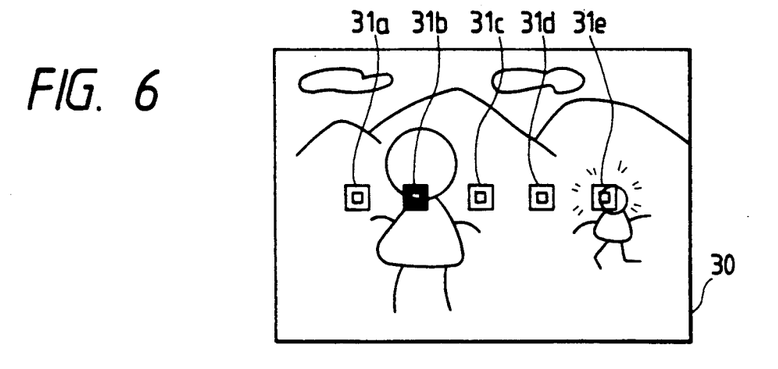

A description will now be given of a case where the calculated Tv value is smaller than the camera shake limit Tvx value. Suppose, for example, a case where as shown in FIG. 6, objects on which the camera can be focused are caught at the distance measuring positions 31b and 31e and the sky is cloudy and the Ev value found at the step 4 is small. Let it be assumed that in this case, the Tv value calculated at the step 5 has reached a value corresponding to 1/60 sec. Since the focal length of the lens is 125 mm, the camera shake limit Tvx value is a value corresponding to 1/125 sec.

That is, at the step 6, Tvx>Tv and an advance is made to a step 11.

Step 11: Tv=Tvx is brought about. That is, the calculated shutter Tv value is a value corresponding to 1/60 sec., but if exposure is effected at this value, camera shake will result and therefore, the shutter is controlled at 1/125 sec. corresponding to the Tvx value. Since here the shutter time has been advanced by one step, the aperture must be returned by one step to obtain proper exposure.

If, for example, the calculated aperture value is an Av value corresponding to F8, the aperture is returned by one step and set to F5 or F6. That is, $Av=Ev-Tv(Tvx)$ is effected to thereby calculate an aperture value at which proper exposure can be obtained without causing camera shake.

step 12: When the aperture has been opened by one step as described above, it becomes impossible to place both objects at 31b and 31e into the depth of field.

Consequently, at this step, among the defocus amounts of the objects formed at the step 3, the defocus amount to the nearest object is selected and this defocus amount is transmitted to the lens device LNS, thereby driving the lens. That is, in the case of the objects of FIG. 6, the object at the distance measuring position 31b is the nearest object and therefore, the motor LMTR is driven in conformity with the defocus amount found to this object at the step 3 to thereby drive the lens and focus the lens to said object. At this time, the lens is not driven so that the object at 31b may be placed into the center of the depth of field relative to the object at 31b, but the lens is shifted toward the farthest point to thereby focus the lens (focus the lens so that the object at 31b may enter the nearest point side of the depth of field), whereby the degree of blur relative to the object at 31e is made as small as possible.

In this manner, the lens is focused to the nearest object when neither of the objects is in focus and therefore, the resultant photograph is prevented from becoming a blurry photograph as a whole.

Step 13: In the lens driving according to the abovedescribed step 12, the object at 31b is in focus, while the object at 31e is out of focus. Accordingly, at this step, the LED for the in-focus position is turned on and among the selected objects, the LED for the non-infocus position is turned on and off to thereby display this. In this case, LEDb is left turned on to display in-focus and LEDe is turned on and off to inform the photographer that the object at 31e is out of focus.

Thereafter, when the switch SW2 is closed, an advance is made to the step 10 as previously described, and film exposure and the operation of preparing for the next photographing are effected.

Figures 8, 8A:
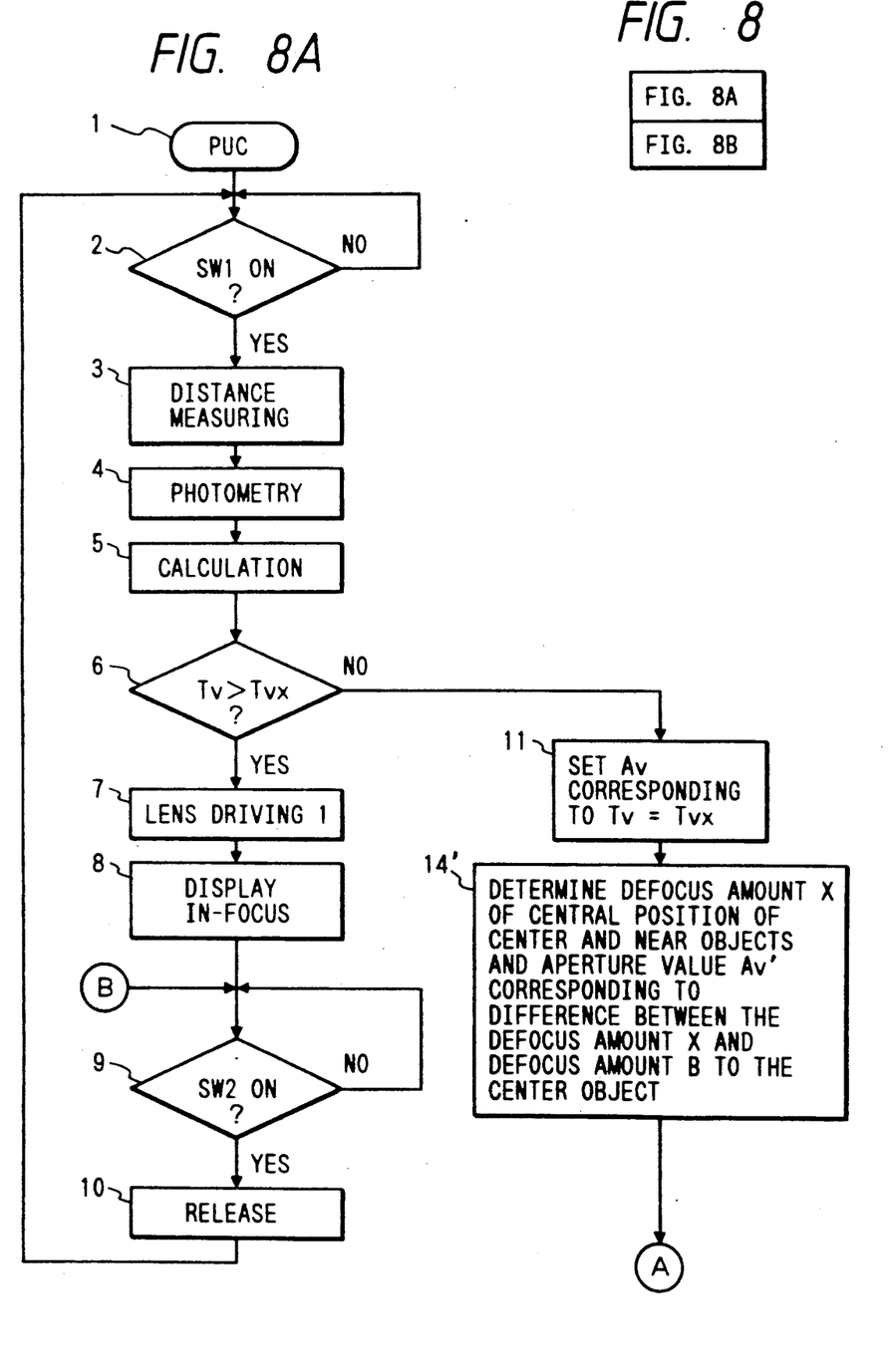
Figure 8B:
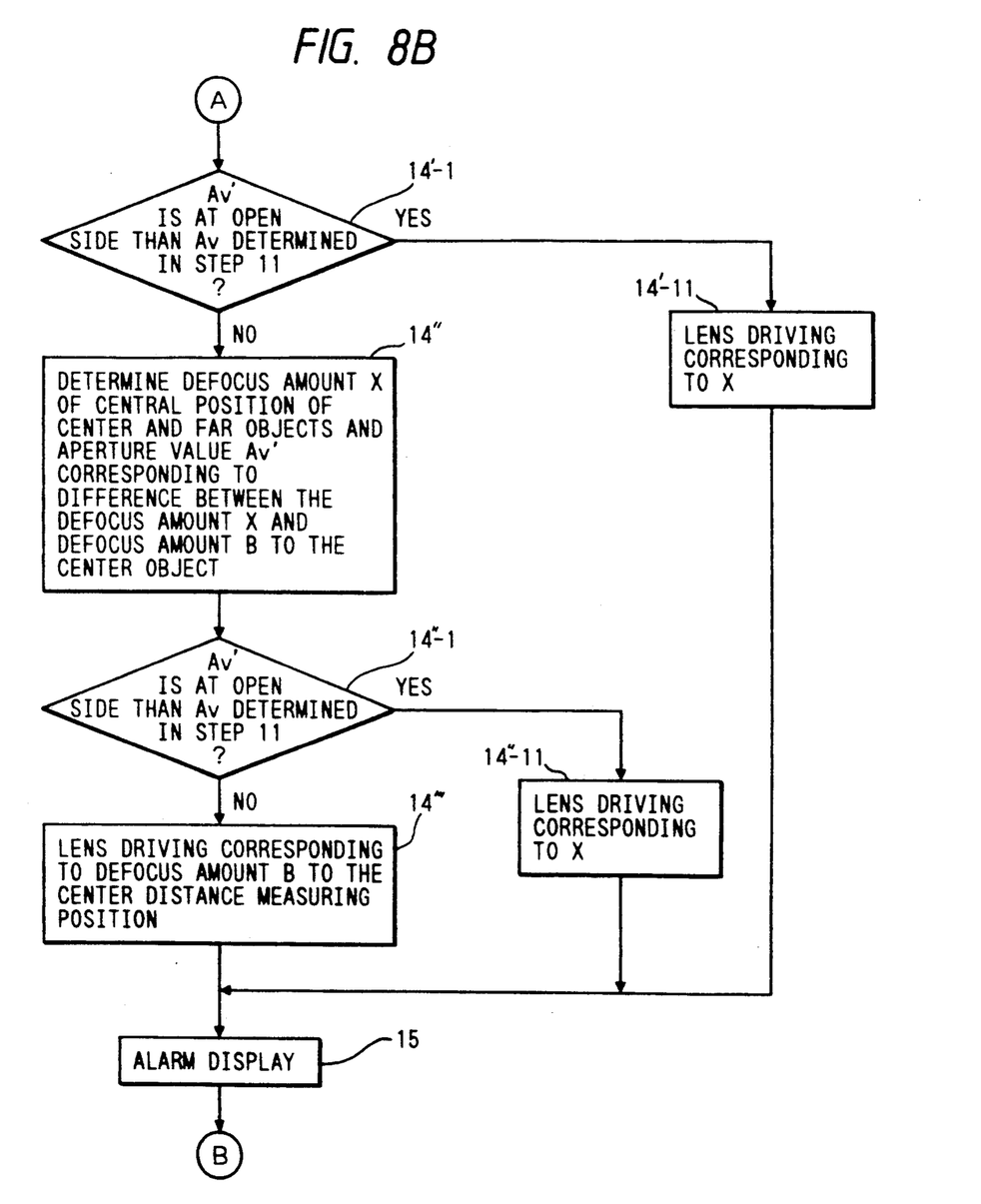

FIG. 8 is a flow chart showing the program flow in another embodiment of the present invention.

The operation of said another embodiment of the present invention will hereinafter be described with reference to this flow chart.

In the flow, steps 1 to 11 are entirely the same as the flow shown in FIG. 4, and the defocus amount X and aperture value at which the lens is in focus to each selected object are determined. Now, where as shown in FIG. 7, the objects at three distance measuring positions 31a, 31c and 31e are the subjects of distance measurement, at a step 5, the distance measuring areas 31a, 31c and 31e are selected, and defocus amounts representative of the near point and the far point of them are selected, and the defocus amount X of the midpoint of the defocus amounts of these near and far points is determined in the manner described previously, and at a step 7, the lens is driven to this position and also the aperture value is determined by the difference a between the defocus amount of the near point or the far point and the defocus amount of said midpoint and the aperture is controlled in conformity with this difference α, whereby a photograph in focus to each object can be obtained.

On the other hand, at a step 6, Tvx < Tv is judged and when at a step 11, the aperture is shifted toward the fully open side, a step 14' is executed.

Figure 7:
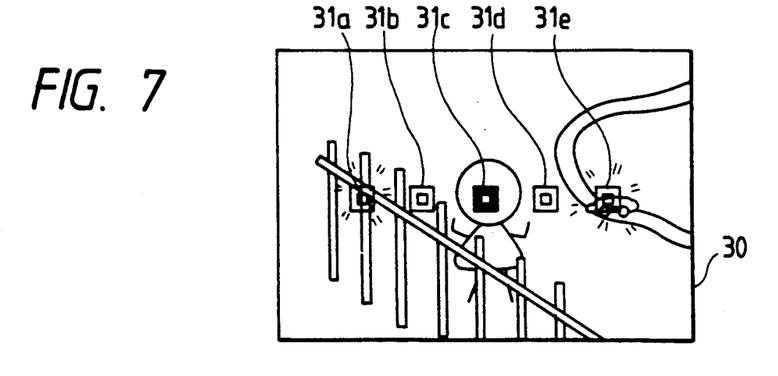

At this step, the defocus amount X to the midpoint between the nearest and center distance measuring positions of the selected objects of distance measurement, i.e., in the case of FIG. 7, between 31a and 31c, and the difference α between the defocus amount X to the midpoint and the defocus amount A or B to 31a or 31c are determined, and an aperture value AV' corresponding to said difference α is determined. The aperture value corresponding to said difference α is compared with the aperture value Av determined at the step 11 and when the aperture value AV' corresponding to said difference α is more toward the fully open side than the aperture value determined at the step 11, an advance is made to a step 15 through a step 14'-11, and the distance measuring positions 31a and 31c are turned on and an advance is made to a step 9. In this case, the lens is shifted to the mid position between the lens positions corresponding to the defocus amounts to the objects at the distance measuring positions 31a and 31c, whereby there is obtained a photograph which is in focus to the objects at the distance measuring positions 31a and 31c.

Also, when the aperture value AV' corresponding to the difference α at the step 14' is more toward the stop-down side than the aperture value at the step 11, that is, when the lens cannot be focused on the objects at the distance measuring positions 31a and 31c, a shift is made to a step 14".

At this step 14", the defocus amount X to the midpoint between the farthest and central ones of the selected distance measuring positions, in this case, between 31e and 31c, and the difference α between the defocus amount X and the defocus amount $C_1$ or $B_1$ to 31e or 31c are determined, and an aperture value AV' corresponding to said difference α is determined. When at a step 14"-1, the aperture value corresponding to said difference α is more toward the fully open side than the aperture value determined at the step 11, an advance is made to the step 9 through steps 14"-11 and 15. Consequently, in this case, the lens is driven to the mid position between the infocus positions to the objects at the distance measuring positions 31c and 31e, whereby there is obtained a photograph which is in focus to the objects at the distance measuring positions 31c and 31e.

Also, when the aperture value corresponding to the difference α at the step 14" is more toward the stop-down side than the aperture value at the step 11, an advance is made to a step 14'''.

At the step 14''', the lens is driven to a position corresponding to the defocus amount $B_1$ to the center distance measuring position 31c and focusing is effected to the central object.

In the manner described above, in the flow shown in FIG. 8, when focusing cannot be effected to any of the objects, the lens is driven so as to be in focus to the objects at the near point or the far point including at least the object at the center distance measuring positions.

A step 15 is a step at which the distance measuring position which is in focus is turned on and displayed.

While in the embodiments there has been shown an example in which the distance measuring positions are manually selected, the design may be such that the image signals of each pair of sensor arrays at the distance measuring positions are all introduced and the defocus amounts are determined for each pair of sensor arrays and predetermined ones of the defocus amounts are automatically selected to thereby accomplish automatic selection of the distance measuring positions.

Figure 9:
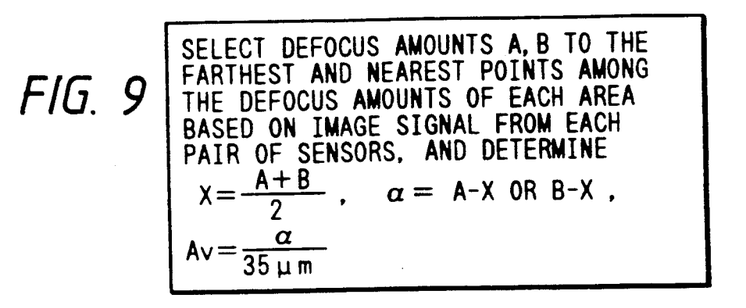
FIGS. 9, 10, and 11 illustrate examples of steps 5, 14' and 14" in FIG. 8.
Figure 10:
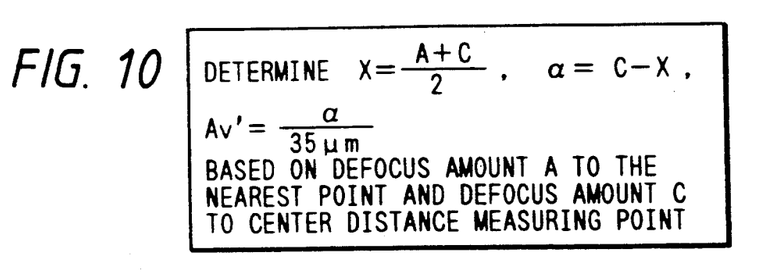
Figure 11:
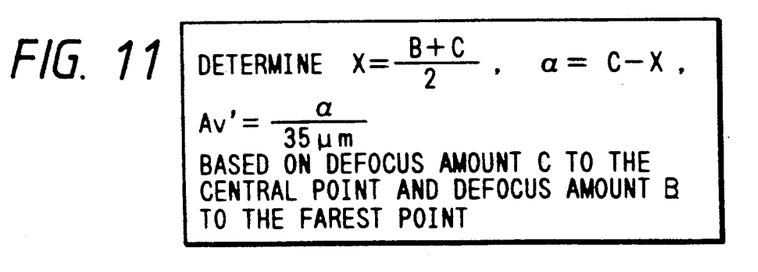

In this case, the design may be such that at the step 5, as shown in FIG. 9, among the defocus amounts to all distance measuring areas, the defocus amounts to the nearest point and the farthest point are selected and the mean defocus amount X of these two defocus amounts and the difference α and Av are determined and at the steps 14' and 14", as shown in FIGS. 10 and 11, the mean defocus amount X of the defocus amount C to the central distance measuring area and the defocus amount to the nearest point or the farthest point and the difference α and Av' are determined.

We claim:

1. A camera having an auto focusing device, including:
   a) a focus detecting circuit for detecting the focus states of objects;
   b) a first calculation circuit for calculating, on the basis of the focus states to the plurality of objects detected by said focus detecting circuit, an aperture value and the lens position;
   c) a photometric circuit;
   d) an exposure calculation circuit for calculating a shutter time on the basis of a photometric output obtained by said photometric circuit and said aperture value;
   e) a judging circuit for judging whether the shutter time calculated by said exposure calculation circuit is outside a predetermined shutter time range; and
   f) a driving circuit for driving a lens to the lens position calculated by said first calculation circuit, said driving circuit inhibiting the driving of the lens to the lens position calculated by said first calculation circuit when it is judged by said judging circuit that the shutter time is outside said predetermined shutter time range.

2. A camera according to claim 1, further including a control circuit for outputting to said driving circuit a lens position signal corresponding to the focus state to a predetermined object detected by said focus detecting circuit when it is judged by said judging circuit that the shutter time is outside said predetermined shutter time range.

3. A camera according to claim 1, wherein said judging circuit judges that the shutter time calculated by said exposure calculation circuit is outside said predetermined shutter time range when it is longer than the camera shake limit time.

4. A camera according to claim 3, wherein said camera shake limit time is a value corresponding to the focal length value of the lens.

5. A camera according to claim 2, wherein said control circuit selects the focus state representative of the nearest object from among the focus states to the objects detected by said focus detecting circuit, and outputs a lens position signal corresponding to said focus state.

6. A camera according to claim 1, wherein said focus detecting circuit has a plurality of focus detecting means for independently detecting the focus states to the objects in the different areas of picture plane.

7. An auto focusing device, including:
   (a) a focus detecting circuit for detecting defocus amounts of objects;

(b) a calculation circuit for calculating information pertaining to a lens position and an aperture value which are capable of placing a plurality of objects in-focus on the basis of the defocus amounts;

(c) a selection circuit for selecting one defocus amount of a predetermined object of said plural objects when the aperture value determined by said calculation circuit is outside of a predetermined range; and (d) a lens driving circuit for effecting a lens driving operation on the basis of the lens position information obtained by said calculation circuit or the one defocus amount selected by said selection circuit.

8. An auto focusing device according to claim 7, wherein said selection circuit selects a defocus amount representing a near point among the defocus amounts detected by said focus detecting circuit.

9. An auto focusing device according to claim 7, wherein said selection circuit selects a defocus amount to an object at the center of a field of view from among the defocus amounts detected by said focus detecting circuit.

10. An auto focusing device according to claim 7, further comprising a discrimination circuit for judging that the aperture value is outside the predetermined range when a shutter speed obtained based on the aperture value calculated by said calculation circuit and a photometry output becomes longer than a predetermined shutter speed.

11. An auto focusing device according to claim 7, wherein said focus detecting circuit, said calculation circuit, and said selection circuit are incorporated in a camera.

12. An auto focusing device, comprising:
(a) a focus detecting circuit for detecting defocus amounts of objects;
(b) a calculation circuit for calculating information pertaining to a lens position for placing a plurality of objects in-focus on the basis of the detected defocus amounts, said calculation circuit obtaining, when the defocus amount difference between a first object and a second object is within a predetermined range, information pertaining to a lens position capable of placing said first and second objects in-focus, and obtaining, when the defocus amount difference between said first object and said second object exceeds the predetermined range, information pertaining to a lens position capable of placing two objects, the defocus amount difference between which is within said predetermined range, in-focus; and
(c) a driving circuit for driving a lens to a position determined by said calculation circuit.

13. An auto focusing device according to claim 12, wherein said calculation circuit calculates the defocus amount difference between a near object and a far object as said first object and said second object.

14. An auto focusing device according to claim 13, wherein, when the defocus amount difference between said first and second objects exceeds the predetermined range, said calculation circuit calculates information pertaining to a lens position for placing said first object and a third object different from said second object in-focus.

15. An auto focusing device according to claim 12, wherein said focus detection circuit and said calculation circuit are incorporated in a camera.

16. An auto focusing device for use with a focus detection circuit having a plurality of sensor portions for independently detecting focusing signals to plural objects located in difference areas in a field of view, comprising:
(a) a calculation circuit for calculating information pertaining to a lens position for placing at least two objects of said plural objects in-focus;
(b) a restriction circuit for selecting, when a defocus amount difference between said two objects is larger than a predetermined value, a plurality of objects whose defocus amount difference is within said predetermined value, and for causing said calculation circuit to calculate information pertaining to a lens position for placing the selected plural objects in-focus; and
(c) a lens driving circuit for driving the lens to the position determined by said calculation circuit.

17. An auto focusing device according to claim 16, wherein said restriction circuit, when the defocus amount difference between a near first object and a far second object is larger than the predetermined value, selects said near first object and a third objected located closer than said far second object.

18. An auto focusing device according to claim 17, wherein said restriction circuit selects said second object and said third object when the defocus amount difference between said first and third objects is larger than the predetermined value.

19. An auto focusing device according to claim 18, wherein said restriction circuit selects the third object when the defocus amount difference between the second and third objects is larger than the predetermined value, and causes said driving circuit to drive the lens to place the third object in-focus on the basis of the defocus amount of the third object.

20. An auto focusing device according to claim 17, wherein the third object is in a center area of an object field.

21. An auto focusing device according to claim 16, wherein said calculation circuit and said restriction circuit are incorporated in a camera.

22. An auto focusing device, including:
(a) a focus detection circuit for detecting defocus amounts of a plurality of objects;
(b) a calculation circuit for calculating information pertaining to a lens position and an aperture value for placing in-focus first and second objects among the plurality of objects on the basis of the detected defocus amounts, for selecting, when the aperture value is outside of a predetermined range, two objects the aperture value for which will place said two objects in-focus, and for calculating information pertaining to a lens position to place said two objects in-focus; and
(c) a lens driving circuit for driving the lens on the basis of the lens driving information calculated by said calculation circuit.

23. An auto focusing device or a camera according to claim 22, further comprising a discrimination circuit for judging that the aperture value is outside the predetermined range when a shutter speed obtained based on the aperture value calculated by said calculation circuit and a photometry output becomes longer than a predetermined shutter speed.

24. An auto focusing device for use with a focus detection circuit having a plurality of sensor portions for independently detecting focusing signals to plural objects located in different areas in a field of view, comprising:
(a) a calculation circuit for selecting a plurality of objects from among said objects in the different areas, and for calculating, based on a defocus amount difference between the selected objects, information pertaining to a lens position and an aperture value corresponding to said defocus amount to place said selected objects in-focus;
(b) a driving circuit for driving the lens to a position determined by said calculation circuit; and
(d) an aperture control circuit for setting an aperture to the value obtained by said calculation circuit.

25. An auto focusing device according to claim 24, further comprising an indication circuit for indicating areas corresponding to said objects which are made in-focus when the lens is driven to the position determined by the calculation circuit.

26. An auto focusing device according to claim 25, wherein said calculation circuit is incorporated in a camera.

* * * * *

UNITED STATES PATENT AND TRADEMARK OFFICE
CERTIFICATE OF CORRECTION

PATENT NO. : 5,091,742

DATED : February 25, 1992

INVENTOR(S) : Hidehiko FUKAHORI, et al.

It is certified that error appears in the above-identified patent and that said Letters Patent is hereby corrected as shown below:

Title page, item
[56] References Cited
U.S. PATENT DOCUMENTS
    Line 1, "Matsumara et al." should read --Matsumina et al.--.

COLUMN 1:
    Line 44, "to" should be deleted; and
    Line 45, "a" should be deleted.

COLUMN 5:
    Line 3, "/TINTEO" should read --/TINTEI--;
    Line 17, "/TINTEO" should read --/TINTEI--; and
    Line 24, "clock, signal" should read --clock signal,--.

COLUMN 6:
    Line 15, "ITINTEI" should read --/TINTEI--.

COLUMN 8:
    Line 9, "step 12:" should read --Step 12:--; and
    Line 33, "abovede-" should read --above-de- --.

UNITED STATES PATENT AND TRADEMARK OFFICE
CERTIFICATE OF CORRECTION

PATENT NO. : 5,091,742

DATED : February 25, 1992

INVENTOR(S) : Hidehiko FUKAHORI, et al.

It is certified that error appears in the above-identified patent and that said Letters Patent is hereby corrected as shown below:

COLUMN 9:
  Line 45, "infocus" should read --in-focus--.

COLUMN 10:
  Line 65, "of picture" should read --of a picture--.

COLUMN 12:
  Line 23, "objected" should read --object--; and
  Line 59, "or a camera" should be deleted.

COLUMN 14:
  Line 1, "(d)" should read --(c)--.

Signed and Sealed this

Thirteenth Day of July, 1993

Attest:

MICHAEL K. KIRK

Attesting Officer

Acting Commissioner of Patents and Trademarks